(12) United States Patent
Larsen

(10) Patent No.: US 8,758,100 B2
(45) Date of Patent: Jun. 24, 2014

(54) TRANSPORT CHUTE FOR FISH

(76) Inventor: Asbjorn Ingemar Larsen, Alsvåg (NO)

( * ) Notice: Subject to any disclaimer, the term of this patent is extended or adjusted under 35 U.S.C. 154(b) by 354 days.

(21) Appl. No.: 13/135,729

(22) Filed: Jul. 6, 2011

(65) Prior Publication Data

US 2012/0009858 A1    Jan. 12, 2012

(30) Foreign Application Priority Data

Jul. 9, 2010  (NO) .................................... 20100994

(51) Int. Cl.
  *A22B 7/00*    (2006.01)
(52) U.S. Cl.
  USPC ............................................. 452/178
(58) Field of Classification Search
  USPC .................. 452/178, 177, 182, 183
  See application file for complete search history.

(56) References Cited

U.S. PATENT DOCUMENTS

| | | | | |
|---|---|---|---|---|
| 3,696,631 A * | 10/1972 | Valdes | ............................ | 62/282 |
| 4,081,075 A * | 3/1978 | Puretic | ............................ | 198/812 |
| 4,304,189 A * | 12/1981 | Wright | ............................ | 114/254 |
| 4,442,786 A * | 4/1984 | Conners | ............................ | 114/255 |
| 7,057,118 B2 * | 6/2006 | Arnason et al. | ............. | 177/25.18 |
| 7,252,584 B2 * | 8/2007 | Kragh | ............................ | 452/163 |

* cited by examiner

*Primary Examiner* — Richard Price, Jr.

(74) *Attorney, Agent, or Firm* — Francis C. Hand; Carella, Byrne, et al

(57) ABSTRACT

A device is described for conveying a catch, such as fish, which is brought on board a vessel and loosened from the fishing tackle for transport to further processing, and it is characterized in that in connection to or below the unhooking location of the vessel, a tilting gliding chute is arranged, onto which the fish is made to fall to be transported to further processing.

6 Claims, 3 Drawing Sheets

TRANSPORT CHUTE FOR FISH

The present invention relates to a device for conveying a catch, such as fish, which is taken onboard a vessel and loosened from the fishing equipment, as can be The invention is particularly related to the handling of fish onboard the fishing vessel, before it is brought to a final processing onboard. This may be bringing the fish into a bleeding installation etc.

Norwegian patent NO325877, with the same applicant as the present application, disclose a method for handling fish falling from a line as it is hauled aboard a fishing boat, where the fish is made to fall into a well of water, from where it is made to flow onwards to further processing. NO325877 does not disclose the use of a tilted gliding chute to break the fall of the fish as it is released from the fishing line.

European patent EP1262103A1 discloses a method of sorting shellfish using an inclined surface, where the incline is used in order to get better separation of shellfish by exerting a force on said shellfish on said incline, by means of e.g. a conveyor belt. Similarly, British patent application GB2151948A discloses an apparatus for separating worms from a medium, and WO9953771A1 discloses a method for separating particular objects such as shellfish from a mixture of objects, by using an inclined conveyor system, while WO03043428A2 discloses an in-feed distributing system with a plurality of downwards tilted conveyor belts.

The primary aim of the invention is to in a gentle manner bring the catch to a conveyor belt that leads to the bleeding installation or other further processing of the fish.

In a gentle manner means that one wants to avoid the fish being damaged when it falls off the hook on the line and down into a transport arrangement. Fish, as a fresh food, is very sensitive to damage from impacts when it falls down.

Figure 1:
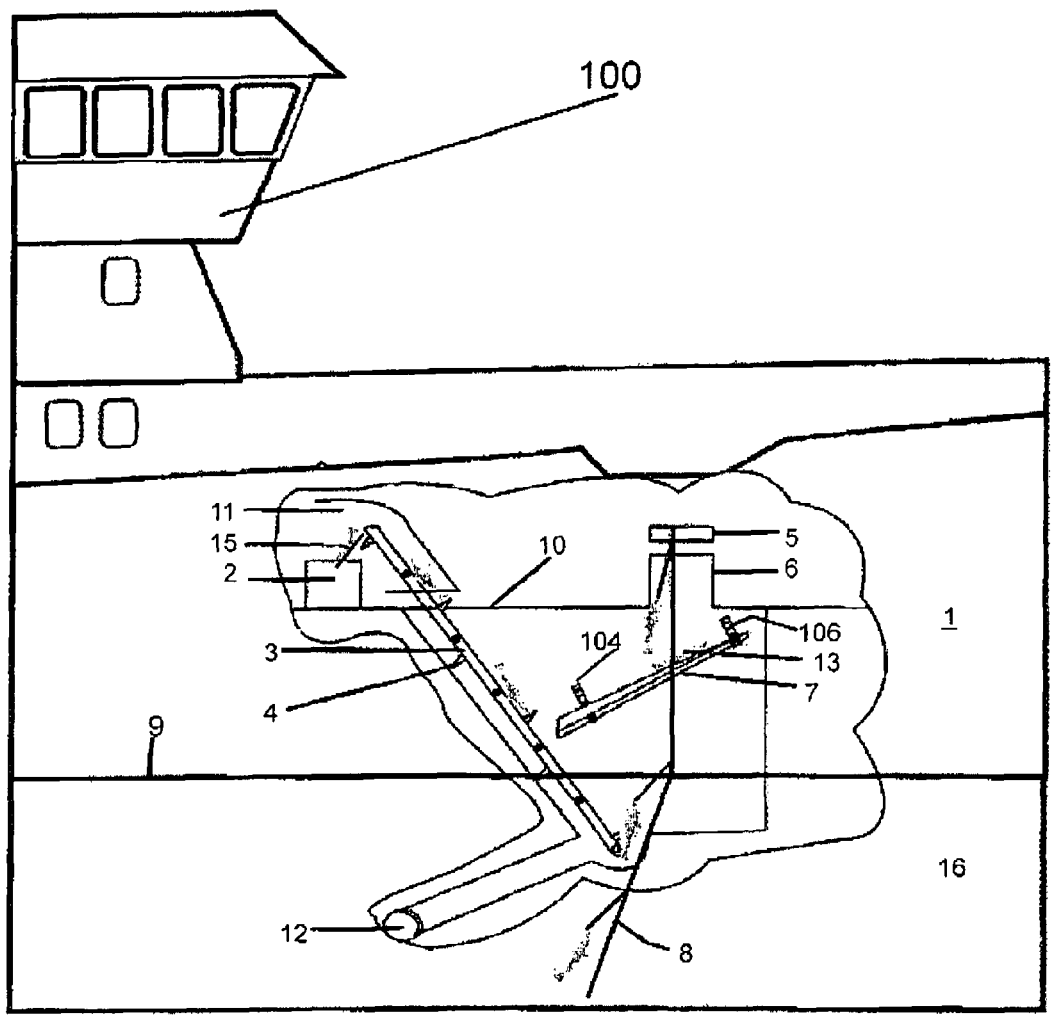
FIG. 1 shows a vertical, longitudinal partial section of a fishing vessel, where it is outlined how a line, which is pulled onboard with a catch of fish, is handled onboard the vessel.

With reference to FIG. 1, parts of the vessel is shown with parts of a superstructure 100, and a side of the vessel which is partly removed to show the device according to the invention inside the hull of the vessel.

On the normal fishing handling deck 10, an example is shown of a bleeding bin 2, and a conveyor belt 3 with carriers 4 for the fish that run from a lower intake section in the hull and up to the deck 10 and ends with a drop from an outlet from the transport chute 15 in said bleeding bin 2. The number 11 represents a cover which lies as protection over the top part of the conveyor belt 4.

A tilting chute 7 is located inside the vessel in a vertically running shaft 6 with a moon pool. The chute forms an extended tray of a smooth, polished material, preferably stainless steel. The tilting of the chute 7 leads to the fish not being damaged unnecessarily when it falls off the hooks on the line and onto said chute.

The suspension of the chute at either end is shown by 104 and 106. Depending on the prevailing catch and how sensitive it is, the tilt of the chute 7 or its angle in relation to the horizontal, can be adjusted by lowering or hoisting the chute via the suspension 104 at the lower end of the chute and/or the suspension 106 at the higher end of the chute. The lowering/hoisting can be carried out with the help of a remotely controlled motor. In this manner an optimal height and angle for dropping the catch can be achieved, further limiting the damage, such as bruising, to the catch.

Figure 2:
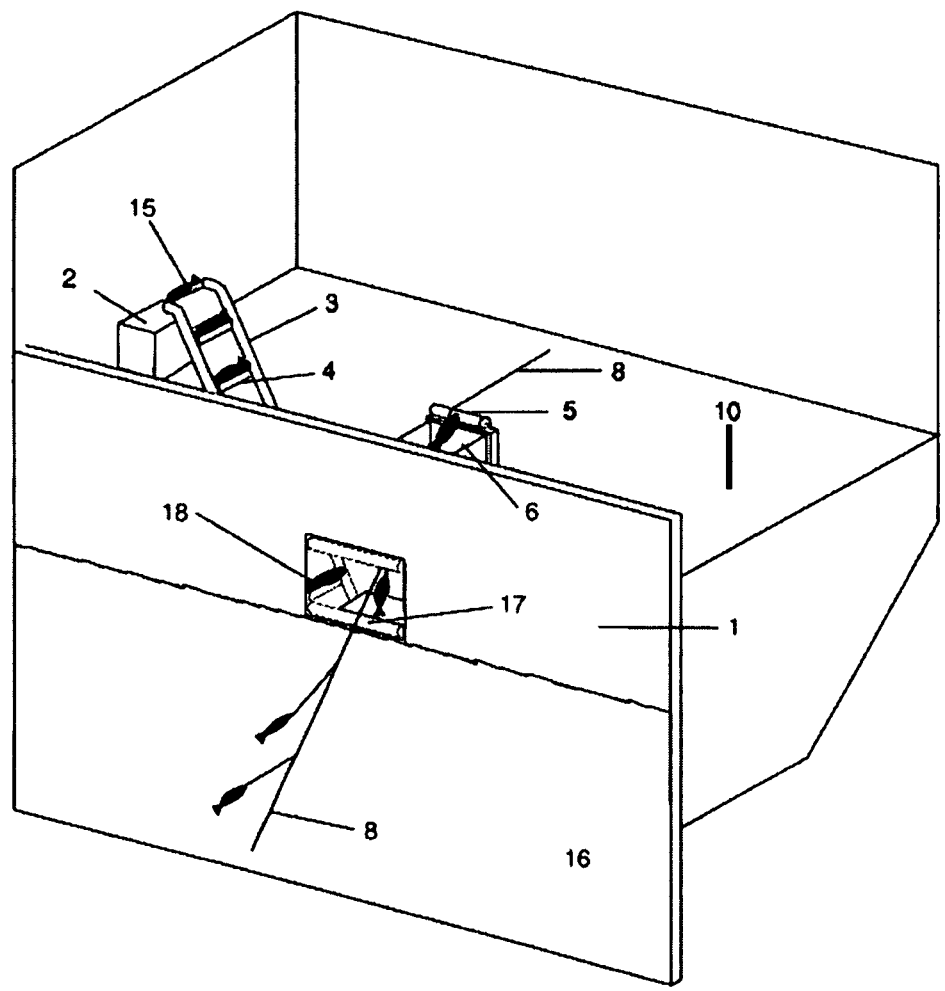
FIG. 2 shows the arrangement onboard the vessel in perspective.

FIG. 2 shows the same details as those shown in FIG. 1. Here, the whole unit is shown in perspective as a processing room with the deck 10 where the different units are placed. Shown by 18 is the hatch that can be closed and through which the line is pulled. Necessary rollers 17 are placed in the opening to ease the pulling in of a line with a catch.

Figure 3:
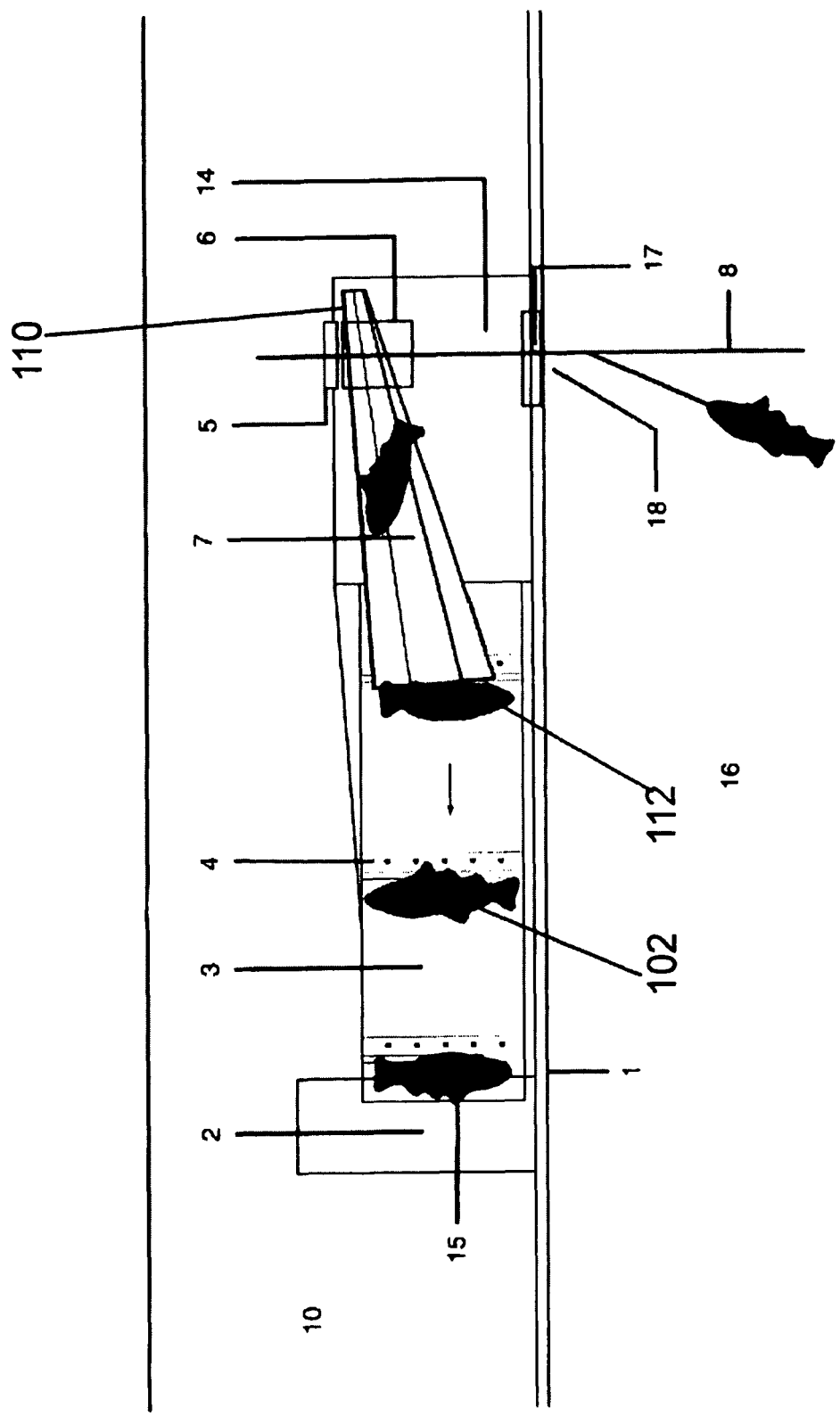
FIG. 3 shows the arrangement of the device seen directly from above.

In FIG. 3 it can be seen in that the chute is preferably shaped as a trapezoidal surface, i.e. that it is narrowest in the area 110 where the fish falls down during the unhooking, and widest in the area 112 where it runs in towards the conveyor belt. It can be seen that the place where the chute ends at its lower edge, at 104, is approximately in the middle of the conveyor belt 3/4.

The chute can have different shapes adapted to the particular use thereof. The bottom surface can be completely flat from side to side, with only a small edge on each side to keep the fish from falling off the sides. On the other extreme, it can be almost circular shaped, with only an opening at the top big enough for the fish to fall onto it.

The fish 102 which is brought onboard from the sea 16 by the line 8, hanging on a hook at the end of a line, is pulled across a roller 5, and pulled from the hook on the line, and falls down into the chute 7.

A fish that falls off the hook on the line 8 on the underside of the chute 7 and drops down into the bottom of the shaft 6 inside the boat, is brought in a direction up to the transport section 3 and 4 in connection with the shaft from where the fish is transported to further processing. In this part of the well or shaft 6 there is a volume of water, in which a stream of water can be set up and thereby bring the catch up to the lower edge 116 of the transport chute 3/4. Thereby, the fish that drops outside the chute will still be taken care of in a good manner and be brought further on the conveyor belt.

The invention claimed is:

1. An apparatus for conveying a catch of fish comprising a line for pulling a plurality of fish onto a vessel;
a vertically disposed shaft for receiving a volume of water;
a conveyor belt having a plurality of carriers for engaging fish thereon, said conveyor belt extending angularly from a lower intake section within the volume of water to an upper outlet section;
a chute pivotally mounted within said shaft and angularly disposed to receive fish falling from said line; said chute extending towards said conveyor belt to deliver fish thereto; and
a bin at said upper outlet section of said conveyor belt to receive fish therefrom.

2. An apparatus as set forth in claim 1 wherein said chute is a tray of polished material.

3. An apparatus as set forth in claim 1 wherein said chute is made of stainless steel.

4. An apparatus as set forth in claim 1 wherein said chute is shaped as a trapezoidal surface having a narrow area at an upper end and a wider area at a lower end.

5. An apparatus as set forth in claim 1 wherein said chute extends towards a middle of said conveyor belt.

6. An apparatus as set forth in claim 1 having a first suspension means at an upper end of said chute for selectively lowering and raising said upper end and a second suspension means at a lower end of said chute for selectively lowering and raising said lower end.

* * * * *